United States Patent [19]

Moczygemba et al.

[11] Patent Number: 5,290,875
[45] Date of Patent: Mar. 1, 1994

[54] CONJUGATED DIENE/MONOVINYLARENE BLOCK COPOLYMERS WITH MULTIPLE TAPERED BLOCKS

[75] Inventors: George A. Moczygemba; Nathan E. Stacy, both of Bartlesville; Nancy R. Knight, Ochelata, all of Okla.

[73] Assignee: Phillips Petroleum Company, Bartlesville, Okla.

[21] Appl. No.: 982,938

[22] Filed: Nov. 30, 1992

[51] Int. Cl.$^5$ ............................................. C08F 297/04
[52] U.S. Cl. ...................................... 525/314; 525/250; 525/271; 525/256; 525/258; 525/259; 525/261
[58] Field of Search .................... 525/314, 271, 250

[56] References Cited

U.S. PATENT DOCUMENTS

| | | | |
|---|---|---|---|
| 4,054,616 | 10/1977 | Miki et al. | 525/314 |
| 4,167,545 | 9/1979 | Fahrbach et al. | 525/314 |
| 4,208,356 | 6/1980 | Fukawa et al. | 525/89 |
| 4,248,981 | 2/1981 | Milkovich et al. | 525/314 |
| 4,335,221 | 6/1982 | Gerberding | 525/314 |
| 4,390,663 | 6/1985 | Nicholson | 525/314 |
| 4,584,346 | 4/1986 | Kitchen | 525/314 |
| 4,704,434 | 11/1987 | Kitchen et al. | 525/314 |
| 4,704,435 | 11/1987 | Kitchen | 525/314 |
| 4,925,899 | 5/1990 | Rendina et al. | 525/314 |
| 5,130,377 | 7/1992 | Trepka et al. | 525/314 |

*Primary Examiner*—James J. Seidleck
*Assistant Examiner*—M. L. Warzel
*Attorney, Agent, or Firm*—Morrison Bennett

[57] ABSTRACT

A method for preparing polymodal tapered block copolymers in a polymerization process by sequentially charging: (a) an initiator and monovinylaromatic monomers in the presence of a randomizer; (b) an initiator and monovinylaromatic monomers; (c) a mixture of monovinylaromatic and conjugated diene monomers; (d) a mixture of monovinylaromatic and conjugated diene monomers; (e) an initiator and monovinylaromatic monomers; (f) a mixture of monovinylaromatic and conjugated diene monomers; (g) a mixture of monovinylaromatic and conjugated diene monomers; (h) conjugated diene monomers; and (i) a coupling agent. The copolymers are particularly useful for packaging applications which require good environmental stress crack resistance.

18 Claims, No Drawings

CONJUGATED DIENE/MONOVINYLARENE BLOCK COPOLYMERS WITH MULTIPLE TAPERED BLOCKS

FIELD OF THE INVENTION

This invention relates to conjugated diene/monovinylarene block copolymers with multiple tapered blocks.

In one aspect, this invention pertains to resinous copolymers which can be made into articles which are resistant to cracking on exposure to oils and fatty products, craze-resistant, and are transparent with minimal coloration.

In another aspect, this invention relates to a method of preparing conjugated diene/monovinylarene block copolymers with multiple tapered blocks.

BACKGROUND OF THE INVENTION

There has developed in the polymer field, and especially in the packaging and related industries, a need for thermoplastic polymers that can be formed into transparent articles having high impact strength with good environmental stress crack resistance. These should be suitable for use with conventional injection and blow molding equipment and also suitable for use in other methods of forming plastics into containers, tubes, films, fibers, and the like. Polystyrene, high impact polystyrene, branched block copolymers, and the like have been developed to meet these criteria with various degrees of satisfaction.

Much effort has been directed to the preparation of substantially transparent block copolymer resins with a variety of block structures produced by a variety of monomer addition sequences and a variety of coupling agents.

Polymerization of styrene and butadiene with organolithium initiators to produce block copolymers in which one or more non-elastomeric polymer blocks are bonded to one or more elastomeric polymer blocks has been disclosed. Block copolymers have been formed by sequential charges of the monomers followed by introduction of one or more coupling agents into the reaction. Styrene-butadiene block copolymers with tapered blocks have been prepared by simultaneous charging of two monomers to the polymerization zone.

Literally thousands of various combinations of sequences of charges of monomers and coupling agents are possible.

SUMMARY OF THE INVENTION

It is an object of this invention to provide novel resinous tapered block copolymers of conjugated dienes and vinyl-substituted aromatic hydrocarbons with improved environmental stress crack resistance.

A further object of this invention is to provide a novel process for making resinous tapered block copolymers of conjugated dienes and vinyl-substituted aromatic hydrocarbons.

The inventive copolymers are prepared by: into a polymerization zone (a) charging a monovinylaromatic monomer and an initiator in the presence of a randomizer and allowing polymerization to occur until essentially no free monomer is present; thereafter (b) charging an initiator and a monovinylaromatic monomer and allowing polymerization to occur until essentially no free monomer is present; thereafter (c) charging a mixture of monovinylaromatic monomer and conjugated diene monomer and allowing polymerization to occur until essentially no free monomer is present; thereafter (d) charging a mixture of monovinylaromatic monomer and conjugated diene monomer and allowing polymerization to occur until essentially no free monomer is present; thereafter (e) charging an initiator and a monovinylaromatic monomer and allowing polymerization to occur until essentially no free monomer is present; thereafter (f) charging a mixture of monovinylaromatic monomer and conjugated diene monomer and allowing polymerization to occur until essentially no free monomer is present; thereafter (g) charging a mixture of monovinylaromatic monomer and conjugated diene monomer and allowing polymerization to occur until essentially no free monomer is present; thereafter (h) charging a conjugated diene monomer and allowing polymerization to occur until essentially no free monomer is present; and thereafter (i) charging the reaction mixture with a coupling agent.

DETAILED DESCRIPTION OF THE INVENTION

The polymers of this invention are characterized as resinous, polymodal block copolymers of at least one conjugated diene with at least one monovinylarene, having at least four random-tapered blocks and are prepared so that, when the choice of coupling agent permits, at least a portion of the final product is of a branched, coupled character.

The polymers prepared according to this invention are polymodal, resinous block copolymers and contain from about 55 to about 95, preferably from about 60 to about 90, and more preferably from about 65 to about 85, weight percent of polymerized monovinyl substituted aromatic hydrocarbon monomer based on the weight of total monomers employed.

The inventive copolymers contain from about 5 to about 45, preferably from about 10 to about 40, and more preferably from about 15 to about 35 weight percent conjugated diene monomer, based on the total weight of monomers incorporated into the copolymer.

The coupled portions of the resinous, polymodal block copolymers of this invention have terminal polymonovinylarene blocks on the extending arms of each linear or radial copolymer molecule, and further contain one or more central internal tapered blocks of monovinylarene and conjugated diene. The resinous copolymeric polymodal products also contain portions of linear uncoupled block copolymers of poly(monovinylarene)-poly(conjugated diene); the linear uncoupled block copolymer content is considered to be an important portion of the resinous product with respect to its overall properties.

The unique polymodal tapered block character and superior environmental stress crack resistance of the polymer is produced by the unique sequences of charges of monovinylaromatic monomer, conjugated diene and initiator stated in the above summary of the invention. The first initiator charge produces active living monovinyl aromatic component polymer blocks with alkali metal atoms on at least one end to form active reaction sites. Each subsequent monomer charge adds monomer to the living polymer chain at the alkali metal reaction. At each stage of charging, polymerization is allowed to continue until essentially no free monomer is present.

With each subsequent charge which includes initiator a different molecular weight species will be produced as well as the opportunity for polymerization of part of the charge with each of the existing species. After virtually complete polymerization of the final charge, the active living linear block copolymers are charged with a polyfunctional coupling agent to allow coupling of each of the living species with each of the other species or with others of the same species to form the desired polymodal tapered block co-polymers.

It is feasible to stretch out over an interval of time the addition of one or more of the increments of initiator and/or the input of the appropriate monovinylarene monomer charge, thus spreading (increasing) further the polymodality of the resulting product upon coupling.

The charging sequence of this invention using an example monovinylaromatic monomer, conjugated diene and coupling agent, and the resulting polymers at each stage, is shown in the following table.

into the chain faster than the monovinyl substituted aromatic; therefore, when both the monovinylaromatic monomer and the conjugated diene are present, the tapered block gradually changes from an essentially polydiene block to an essentially monovinyl substituted aromatic polymer segment. Prior to coupling, all of the living polymer chains have conjugated diene terminal blocks because of the eighth charge containing only conjugated diene monomer.

The process of this invention can be carried out with any of the organomonoalkali metal compounds of the formula RM wherein R is an alkyl, cycloalkyl or arylcarbanion containing 4 to 8 carbon atoms and M is an alkyl metal cation. The presently preferred initiators are alkylmonolithium compounds, especially n-butyllithium or sec-butyllithium.

The conjugated diene monomers which can be used contain 4 to 6 carbon atoms and include 1,3-butadiene, 2-methyl-1,3-butadiene, 2-ethyl-1,3-butadiene, 2,3-dimethyl-1,3-butadiene and 1,3-pentadiene and mixtures thereof. Presently preferred is 1,3-butadiene.

The monovinylaromatic monomers which can be used contain 8 to 12 carbon atoms and include styrene, alpha-methylstyrene, 4-methylstyrene, 3-methylstyrene, 2-methylstyrene, 4-ethylstyrene, 3-ethylstyrene, 2-ethylstyrene, 4-tertbutylstyrene, 2,4-dimethylstyrene

TABLE I

| Charging Sequence | | |
|---|---|---|
| Charge | Contents of Charge | Resulting Polymer Chains |
| (a) | randomizer styrene$_1$ initiator$_1$ | $S_1$—Li$_1$ |
| (b) | initiator$_2$ styrene$_2$ | $S_1$—$S_2$—Li$_1$ $S_2$—Li$_2$ |
| (c) | styrene$_3$ butadiene$_1$ | $S_1$—$S_2$—$B_1/S_3$—Li$_1$ $S_2$—$B_1/S_3$—Li$_2$ |
| (d) | styrene$_4$ butadiene$_2$ | $S_1$—$S_2$—$B_1/S_3$—$B_2/S_4$—Li$_1$ $S_2$—$B_1/S_3$—$B_2/S_4$—Li$_2$ |
| (e) | initiator$_3$ styrene$_5$ | $S_1$—$S_2$—$B_1/S_3$—$B_2/S_4$—$S_5$—Li$_1$ $S_2$—$B_1/S_3$—$B_2/S_4$—$S_5$—Li$_2$ $S_5$—Li$_3$ |
| (f) | styrene$_6$ butadiene$_3$ | $S_1$—$S_2$—$B_1/S_3$—$B_2/S_4$—$S_5$—$B_3/S_6$—Li$_1$ $S_2$—$B_1/S_3$—$B_2/S_4$—$S_5$—$B_3/S_6$—Li$_2$ $S_5$—$B_3/S_6$—Li$_3$ |
| (g) | styrene$_7$ butadiene$_4$ | $S_1$—$S_2$—$B_1/S_3$—$B_2/S_4$—$S_5$—$B_3/S_6$—$B_4/S_7$—Li$_1$ $S_2$—$B_1/S_3$—$B_2/S_4$—$S_5$—$B_3/S_6$—$B_4/S_7$—Li$_2$ $S_5$—$B_3/S_6$—$B_4/S_7$—Li$_3$ |
| (h) | butadiene$_5$ | $S_1$—$S_2$—$B_1/S_3$—$B_2/S_4$—$S_5$—$B_3/S_6$—$B_4/S_7$—$B_5$—Li$_1$ $S_2$—$B_1/S_3$—$B_2/S_4$—$S_5$—$B_3/S_6$—$B_4/S_7$—$B_5$—Li$_2$ $S_5$—$B_3/S_6$—$B_4/S_7$—$B_5$—Li$_3$ |
| (i) | Epoxidized Vegetable Oil | polymodal tapered block polymers with styrene terminal blocks | where S = styrene
B = butadiene
B/S = tapered block
subscripts = designation of the numerical order in which that particular component was charged or formed.
Li = residue from a monoalkali metal initiator remaining on the end of the polymerization chain prior to termination.
and where the randomizer is usually added with the diluent initially charged to the reactor.

As can be seen from the intermediate products listed in the charging sequence table above, there are at least three distinct species of polymer chains before coupling. Thus, polymodal tapered block copolymers comprising relatively high, medium and low molecular weight species are produced.

Tapered blocks in each of the growing polymer chains are produced by simultaneously charging both monomers as in the third, fourth, sixth and seventh steps shown above in the table of the inventive charging sequence. The randomizer causes increased tapering or random polymerization of the monovinylaromatic monomer and the conjugated diene, but the diene still enters and condensed aromatics such as vinyl napthalene and mixtures thereof. Presently preferred is styrene.

The polymerization process is carried out in a hydrocarbon diluent at any suitable temperature in a range of −10° to 150° C., preferably in the range of 0° to 110° C., at pressures sufficient to maintain the reaction mixture substantially in the liquid phase. Preferred hydrocarbon diluents include linear and cycloparaffins such as butane, pentane, hexane, octane, cyclohexane, cyclopentane and mixtures thereof. Presently preferred is cyclohexane. Generally the temperature is such that the resulting polymer is in solution.

Small amounts of polar compounds are used in the hydrocarbon diluent to improve the effectiveness of alkylmonoalkali metal initiators such as n-butyllithium and to effect partial randomization of the vinylarene/conjugated diene so as to increase the random portion of the tapered block. Examples of polar compounds which can be advantageously employed are ethers, thioethers (sulfides) and tertiary amines. It is usually preferred to use ethers and sulfides in which the radicals attached to the oxygen or sulfur atoms are hydrocarbon radicals. Specific examples of such polar materials include dimethyl ether, diethyl ether, ethyl methyl ether, ethyl propyl ether, di-n-propyl ether, di-n-octyl ether, anisole, dioxane, 1,2-dimethoxyethane, dibenzyl ether, diphenyl ether, 1,2-dimethoxybenzene, tetramethylene oxide (tetrahydrofuran), dimethyl sulfide, diethyl sulfide, di-n-propyl sulfide, di-n-butyl sulfide, methyl ethyl sulfide, dimethylethylamine, tri-n-ethylamine, tri-n-propylamine, tri-n-butylamine, trimethylamine, triethylamine, tetramethylethylenediamine, tetraethylethylenediamine, N,N-di-methylaniline, N-methyl-N-ethylaniline, N-methylmorpholine, and the like. It is to be understood also that mixtures of these polar compounds can be employed in the practice of the present invention. The polar compounds are generally used in admixture with the hydrocarbon diluent. Presently preferred are either tetrahydrofuran or diethyl ether.

The initial monovinylaromatic charge is made with the randomizer present for the additional effect of causing the monovinylaromatic component resulting from each initiator charge to be of relatively narrow molecular weight distribution. By varying the amounts of initiator in each of the three charges having initiator the differences in molecular weights of the monovinylaromatic components resulting from each of the three charges can be increased. Surprisingly, superior results are obtained by having the monovinylaromatic components resulting from each initiator charge be of relatively narrow molecular weight distribution while having a relatively broad molecular weight distribution in the polymodal polymer.

The polymerization is carried out in a substantial absence of oxygen and water, preferably under an inert gas atmosphere. Prior to the coupling step, the reaction mass contains a very high percentage of molecules (polymer chains) in which an alkali metal cation is positioned at one end of each polymer chain. Impurities in the feed such as water or alcohol reduce the amounts of monoalkali metal polymer in the reaction mass.

After virtually complete polymerization of the final monomer charge added to the polymer, a suitable polyfunctional coupling agent is added. As used here, the term "coupling" means the bringing together and joining, by means of one or more central coupling atoms or coupling moieties, two or more of the living monoalkali metal-terminated polymer chains. A wide variety of compounds for such purposes can be employed.

Among the suitable coupling agents are the di- or multivinylaromatic compounds, di- or multiepoxides, di- or multiisocyanates, di- or multiimines, di- or multialdehydes, di- or multiketones, tri-alkylarylphosphites, alkoxytin compounds, di- or multihalides, particularly silicon halides and halosilanes, mono-, di-, or multianhydrides, mono-, di-, or multiesters, preferably the esters of monoalcohols with polycarboxylic acids, diesters which are esters of monohydric alcohols with dicarboxylic acids, lactones, and the like, including combination type compounds containing two or more groups and mixtures.

Epoxidized hydrocarbon polymers such as epoxidized liquid polybutadiene and the epoxidized vegetable oils such as epoxidized soybean oil and epoxidized linseed oil, and epoxy compounds such as 1,2; 5,6; 9,10-triepoxydecane, and the like, can be used.

Organoalkyl phosphites and arylalkyl phosphites are considered useful as coupling agents in this invention.

Examples of suitable multiisocyanates include benzene-1,2,4-triisocyanate, naphthalene-1,2,5,7-tetraisocyanate, and the like. Commercially available products known as PAPI-1, a polyarylpolyisocyanate having an average of 3 isocyanate groups per molecule and an average molecular weight of about 380 are suitable.

The multiimines, also known as multiaziridinyl compounds, such as those containing 3 or more aziridine rings per molecule, are useful. Other compounds useful as coupling agents include tetravinyl silane, trivinyl phosphine, the triaziridinyl phosphine oxides or sulfides such as tri(1-aziridinyl)phosphine oxide, tri(2-methyl-1-aziridinyl)-phosphine oxide, tri(2-ethyl-3-decyl-1-aziridinyl)phosphine sulfide, and the like.

The multialdehydes are represented by compounds such as 1,4,7-naphthalenetricarboxyaldehyde, 1,7,9-anthracenetricarboxyaldehyde, 1,1,5-pentanetricarboxyaldehyde, and similar multialdehyde-containing aliphatic and aromatic compounds. The multiketones are represented by compounds such as 1,4,9,10-anthracenetetrone, 2,3-diacetonylcyclohexanone, and the like. Examples of the multianhydrides include pyromellitic dianhydride, styrene-maleic anhydride copolymers, and the like. Examples of the multiesters include diethyladipate, triethylcitrate, 1,3,5-benzenetricarboxylic acid, triethyl ester, and the like.

Among the multihalides are the silicon tetrahalides such as silicon tetrachloride, silicon tetrabromide, and silicon tetraiodide; the trihalosilanes such as trifluorosilane, trichlorosilane, trichloroethylsilane, tribromobenzylsilane, and the like; and the multihalogen-substituted hydrocarbons, such as 1,3,5-tri(bromomethyl)benzene, 2,5,6,9-tetrachloro-3,7-decadiene, and the like, in which the halogen is attached to a carbon atom which is alpha to an activating group such as an ether linkage, a carbonyl group, or a carbon-to-carbon double bond. Substituents inert with respect to lithium atoms in the terminally reactive polymer can also be present in the active halogen-containing compounds. Alternatively, other suitable reactive groups different from the halogens as described above can be present.

Examples of compounds containing more than one type of functional group include 1,3-dichloro-2-propanone, 2,2-dibromo-3-decanone, 3,5,5-trifluoro-4-octanone, 2,4-dibromo-3-pentanone, 1,2,4,5-diepoxy-3-pentanone, 1,2; 4,5-diepoxy-3-hexanone, 1,2;11,12-diepoxy-8-pentadecanone, 1,3; 18,19-diepoxy-7,14-eicosanedione, and the like.

Other metal multihalides, particularly those of tin, lead, or germanium, can be employed as coupling and branching agents. Silicon or other metal multialkoxides, such as silicon tetraethoxide, are also suitable coupling agents.

The presently preferred coupling agent is epoxidized vegetable oil. Most preferred is epoxidized soybean oil.

Any effective amount of the coupling agent can be employed. While the amount is not believed to be particularly critical, a stoichiometric amount relative to the active polymer-alkali metal tends to promote maximum coupling as a generality. Presently preferred when using epoxidized vegetable oil is an amount of coupling agent greater than stoichiometric relative to the active polymer-alkali metal. However, less than stoichiometric amounts can be used for lesser degrees of coupling where desired for particular products of broadened molecular weight distribution.

Typically, the total amount of coupling agent is in the range of about 0.1 to 10 phm (parts per 100 parts of total monomers employed in the polymerization). Presently preferred is about 0.2 to about 0.5 phm, depending upon amounts of initiator used.

At the conclusion of the coupling process, the system is treated with an active hydrogen compound such as water, alcohol, phenols or linear saturated aliphatic mono- and dicarboxylic acids to remove the lithium from the polymer. Preferably, the polymer cement, i.e. the polymer and the polymerization solvent, is treated with terminating agents such as water and carbon dioxide and then antioxidants and/or other stabilizers known in the art.

The resins can then be stabilized with a combination of a hindered phenol and an organophosphite, specifically, octadecyl 3-(3',5'-di-t-butyl-4'-hydroxyphenyl) propionate and tris-nonylphenylphosphite. After stabilization, the hydrocarbon diluent is then flashed off the polymer solution to increase the solids content.

A typical charging sequence and ranges of amounts of the charges are given in Table II.

The weight ratio of monovinyl substituted aromatic monomer to conjugated diene monomer in charges (c), (d), (f) and (g) is from about 1:0.63 to about 1:2, preferably from about 1:0.67 to about 1:1.8, and more preferably from about 1:0.8 to about 1:1.5.

Generally each of the four tapered blocks made in steps (c), (d), (f) and (g) should be of about equal size; however, actual sizes of the four tapered blocks can vary within the same copolymer depending upon the amounts of monovinylaromatic monomer charged in the third, fourth, sixth and seventh charges ($S_3$, $S_4$, $S_6$, and $S_7$).

The amounts of polar compounds used as randomizers in this invention will vary according to the reactivity and effectiveness of the particular randomizer used. For example, 1,2-dimethoxymethane, tetramethylethylenediamine and 1,2-dimethoxybenzene are much more efficient randomizers than most of the others listed above when used with the particular initiators and monomers used in the invention runs described below. However, tetrahydrofuran is often used because the reaction will go on to nearer completion in a shorter time after the initial reaction in the monomer rich environment. Also, there are dramatic variations in the amounts of each of these most efficient randomizers which will be needed. For example, for polymerizations such as those shown in the examples of invention runs in Table VII of this application, about three and a half times as much tetrahydrofuran as 1,2-dimethoxyethane would be needed.

TABLE II

| Charge[a] | Component | Ranges of Amounts of Components in a Typical Charging Sequence | | |
|---|---|---|---|---|
| | | Broad Range | Preferred Range | Most Preferred Range |
| (a) | tetrahydrofuran | 0.01–10 phm[b] | 0.02–2.0 phm | 0.03–1.0 phm |
| | initiator | 0.005–1.5 phm | 0.01–1.0 phm | 0.02–0.5 phm |
| | monovinylaromatic monomer | 20–50 phm | 25–45 phm | 32–38 phm |
| (b) | initiator | 0.005–1.5 phm | 0.01–1.0 phm | 0.02–0.1 phm |
| | monovinylaromatic monomer | 5–20 phm | 7–15 phm | 9–13 phm |
| (c) | conjugated diene monomer and | 2–7 phm | 3–6 phm | 4–5 phm |
| | monovinylaromatic monomer | 2–7 phm | 3–6 phm | 4–5 phm |
| (d) | conjugated diene monomer and | 2–7 phm | 3–6 phm | 4–5 phm |
| | monovinylaromatic monomer | 2–7 phm | 3–6 phm | 4–5 phm |
| (e) | initiator | 0.01–3.0 phm | 0.02–2.0 phm | 0.04–0.15 phm |
| | monovinylaromatic monomer | 5–20 phm | 7–15 phm | 9–13 phm |
| (f) | conjugated diene monomer and | 2–7 phm | 3–6 phm | 4–5 phm |
| | monovinylaromatic monomer | 2–7 phm | 3–6 phm | 4–5 phm |
| (g) | conjugated diene monomer and | 2–7 phm | 3–6 phm | 4–5 phm |
| | monovinylaromatic monomer | 2–7 phm | 3–6 phm | 4–5 phm |
| (h) | conjugated diene monomer | 2–7 phm | 3–6 phm | 4–5 phm |
| (i) | coupling agent | 0.1–10 phm | 0.2–1 phm | 0.3–0.5 phm |

[a]Components within each charge can be added simultaneously or as a mixture, with the exception that the tetrahydrofuran randomizer in charge (a) may be already present in the diluent.
[b]phm is parts per hundred parts total monomer.

While additional charges with or without initiator are possible, the process preferably consists essentially of the eight charges plus coupling step exemplified in Table II above.

The amounts of polar compounds used as randomizers will also vary according to the desired molecular structure of the portions of tapered blocks which result from conjugated diene addition. For example, it has been observed that in reactions such as those shown in the invention runs listed in Table VI, 1,4 addition of butadiene significantly exceeds 1,2 addition of butadiene when up to about 1.75 parts tetrahydrofuran per hundred parts total monomers is used in each of the 5 charges which includes randomizer. When it is desirable that the tapered blocks of the polymer have more nearly equal amounts of 1,4 addition of butadiene and 1,2 addition of butadiene or only a little more 1,4 addition than 1,2 addition of butadiene, as much as 2.5 phm of tetrahydrofuran can be used.

Generally, when tetrahydrofuran is used as a randomizer and it is desired that 1,4 addition occur in excess of 1,2 addition, then the amounts needed are as shown in Table III.

TABLE III

Example of Useful Amounts of Randomizer When THF Is Used for Major 1,4 Conjugated Diene Addition and Minor 1,2 Conjugated Diene Addition

| Range | phm$^a$ | mhm$^b$ |
|---|---|---|
| Broad | 0.001 to 0.50 | 0.014 to 6.9 |
| Preferred | 0.005 to 0.30 | 0.069 to 4.2 |
| Most Preferred | 0.015 to 0.10 | 0.208 to 1.4 |

$^a$phm is parts per hundred parts total monomers.
$^b$mhm is gram-millimoles per hundred grams of total monomers.

When polymers with higher vinyl character are desired, then the useful amounts of tetrahydrofuran needed would be larger, perhaps as much as 2.5 phm. However, use of too much randomizer would result in excessive termination during polymerization and poor stability of the polymer.

Amounts of initiator employed are those which will produce a resin with desirable melt flow from which can be made articles with a good balance of properties including minimal blueness, good impact strength and flexural modulus. Presently preferred are amounts of initiator in each of the three initiator charges sufficient to obtain a block copolymer having a melt flow ranging from about 2 to about 40 g/10 minutes as determined by ASTM D1238-73, condition G. The amount of initiator contemplated as useful in each of the three charges having initiator is shown in Table IV.

TABLE IV

Amounts of Initiator in Each Charge

| Charge | Units | Broad Range | Preferred Range | More Preferred Range |
|---|---|---|---|---|
| Li$_1$ | phm$^a$ | 0.005–1.5 | 0.01–1.0 | 0.02–0.1 |
|  | mhm$^b$ | 0.078–23.4 | 0.156–15.6 | 0.312–1.56 |
| Li$_2$ | phm | 0.005–1.5 | 0.01–1.0 | 0.02–0.1 |
|  | mhm | 0.078–23.4 | 0.156–15.6 | 0.312–1.56 |
| Li$_3$ | phm | 0.010–3.0 | 0.02–2.0 | 0.04–0.15 |

TABLE IV-continued

Amounts of Initiator in Each Charge

| Charge | Units | Broad Range | Preferred Range | More Preferred Range |
|---|---|---|---|---|
|  | mhm | 0.156–46.8 | 0.312–31.2 | 0.625–2.34 |

$^a$phm is parts per hundred parts total monomer.
$^b$mhm is gram-millimoles per hundred grams of total monomers.

The ratio of the amounts of initiator in the three charges containing initiator can be represented as $$Li_1:Li_2:Li_3::1 \text{ to } 1.2:1.5 \text{ to } 6$$

wherein
Li$_1$ = initiator in the first charge
Li$_2$ = initiator in the second charge
Li$_3$ = initiator in the third charge.

The amounts of initiators are selected such that the amount in the second charge is at least equal to or slightly greater than that employed in the first charge. The amounts used in the third charge should be about 1.5 to 5 times greater than that employed in the second charge.

Varying the ratios of the initiator charges will result in variations of the proportionate amounts of species present in the copolymer. While not wishing to be bound by theory, the inventors believe that when, for example, the first, second and third initiator charges are made in a 1:1:3 ratio and a difunctional coupling agent is used, the following polymer species are present in the inventive copolymer in the relative amounts indicated.

TABLE V

Calculated Proportionate Amounts of Species Present in Copolymer with Difunctional Coupling (Assuming Complete Efficiency of Initiator in 1:1:3 Charge Ratio)

| Species | Relative Amount |
|---|---|
| S$_1$—S$_2$—B$_1$/S$_3$—B$_2$/S$_4$—S$_5$—B$_3$/S$_6$—B$_4$/S$_7$—B$_5$-x-B$_5$—S$_7$/B$_4$—S$_6$/B$_3$—S$_5$—S$_4$/B$_2$—S$_3$/B$_1$—S$_2$—S$_1$ | 0.039 |
| S$_2$—B$_1$/S$_3$—B$_2$/S$_4$—S$_5$—B$_3$/S$_6$—B$_4$/S$_7$—B$_5$-x-B$_5$—S$_7$/B$_4$—S$_6$/B$_3$—S$_5$—S$_4$/B$_2$—S$_3$/B$_1$—S$_2$ | 0.039 |
| S$_5$—B$_3$/S$_6$—B$_4$/S$_7$—B$_5$-x-B$_5$—S$_7$/B$_4$—S$_6$/B$_3$—S$_5$ | 0.117 |
| S$_1$—S$_2$—B$_1$/S$_3$—B$_2$/S$_4$—S$_5$—B$_3$/S$_6$—B$_4$/S$_7$—B$_5$-x-B$_5$—S$_7$/B$_4$—S$_6$/B$_3$—S$_5$—S$_4$/B$_2$—S$_3$/B$_1$—S$_2$ | 0.039 |
| S$_1$—S$_2$—B$_1$/S$_3$—B$_2$/S$_4$—S$_5$—B$_3$/S$_6$—B$_4$/S$_7$—B$_5$-x-B$_5$—S$_7$/B$_4$—S$_6$/B$_3$—S$_5$ | 0.117 |
| S$_2$—B$_1$/S$_3$—B$_2$/S$_4$—S$_5$—B$_3$/S$_6$—B$_4$/S$_7$—B$_5$-x-B$_5$—S$_7$/B$_4$—S$_6$/B$_3$—S$_5$ + | 0.350 |
| terminated uncoupled chains | 0.30 | where S represents monovinylarene blocks
B/S represents tapered conjugated diene/monovinylarene blocks
x represents residual coupling agent or coupling site
and the subscripts are indications of the charges which were the source of the polymer blocks (see Table I and accompanying explanation).

The resinous polymodal polymers of this invention can be blended with general purpose polystyrene. These blends may have from about 5 to about 90 weight percent polystyrene, more preferably from about 20 to about 80 weight percent polystyrene, and most preferably from about 35 to about 65 weight percent polystyrene, based upon total weight of the blend, with the invention polymer comprising the rest of the blend. These blends can be economical ways of gaining the desirable attributes of both polystyrene and the invention polymers.

TEST PROCEDURES

The environmental stress crack resistance potential of the block copolymers was determined in an accelerated test referred to as the Puncture Test. Test specimens about 2 inches square were cut from an interior layer about 0.015 inches thick from a coil or roll of extruded sheet. The side of the film or sheet facing away or furtherest from the center of the coil or roll, of course, must "stretch" or cover more distance than the side closest to the center of the coil or roll. Results obtained from the outside part of a rolled layer are termed "curl down" and those from the inside part are termed "curl up".

Each specimen was clamped over a hole about 1 inch in diameter and 4 drops of soybean oil was placed on the specimen over the hole. A rounded tipped stainless steel rod about ½ cm in diameter was weighted with a 2 kg load and brought into contact with the specimen. The time to failure in minutes was recorded. Ten specimens of each run were tested and the results were averaged.

The puncture test results appear to correlate well with ASTM environmental stress crack resistance test results and are obtained much more quickly.

Other properties were tested using ASTM procedures as indicated in the examples.

The following examples will describe in more detail the experimental process used and the polymodal tapered block copolymers with vinylarene terminal blocks obtained as a result of the process.

EXAMPLES

In the following examples, the copolymer melt flow rates were determined by the method of ASTM D 1238, Condition 200/5.0. The values of melt flow are expressed as grams per ten minutes (g/10 min). Quantities of reagents are usually expressed in parts per hundred monomer (phm) based on the total weight of monovinylarene and conjugated diene employed.

Polymerization runs were carried out under nitrogen in a stirred, jacketed, stainless steel 7.6-liter reactor employing essentially anhydrous reactants and conditions. The cyclohexane diluent, which contained 0.04 phm tetrahydrofuran (THF) in each polymerization except in Example IV, was preheated to about 50° C. before monomers were charged to the reactor. In polymerization steps in which both butadiene and styrene were charged, they were charged simultaneously as a mixture.

In the coupling step, the Vikoflex 7170 coupling agent used was an epoxidized vegetable oil commercially available from Viking Chemical Company. In the terminating step, carbon dioxide from a pressurized container was admitted to provide about 0.4 phm carbon dioxide to the reactor. The stabilizing mixture added in the stabilizing step contained a hindered phenol [octadecyl3-(3',5'-di-t-butyl-4'-hydroxyphenyl) propionate, Irganox® 1076 from Ceiba-Geigy] and an organic phosphite (tris-nonylphenyl phosphite, Weston TNPP). Each stabilizer was dissolved separately in cyclohexane and mixed together and then enough of the mixture was added to the reactor to provide 0.25 phm hindered phenol and 1 phm organic phosphite.

Following the stabilization step (Examples I and II only), the polymer cement was transferred to a 19-liter reactor where it was mixed with 0.15 phm microcrystalline wax (Be Square® 195) as an antiblocking agent. Be Square 195 wax is marketed by Bareco, a Division of Petrolite Corporation, Tulsa, Okla.

Each copolymer solution was then flashed at 178° C. to remove a portion of the diluent. Substantially, all of the remaining diluent was removed in a vacuum oven.

EXAMPLE I

This example describes four invention polymerization runs that were carried out to produce polymodal, coupled, tapered block styrene-butadiene copolymers with a rubbery terminal block prior to coupling and a resinous terminal block after coupling. In each of the four runs (1A, 1B, 1C, and 1D), 2000 g total monomers (butadiene and styrene) was used. About 76 weight percent of the total amount of cyclohexane diluent (3130 g) was charged initially. The remaining cyclohexane diluent was added during the run as a diluent or flush for the various reactants added in subsequent steps. In these polymerizations, the weight ratio of monomers charged was 75/25 styrene/butadiene.

The charges and the results of the runs are summarized in Table VI. Tapered butadiene/styrene segments were formed in steps 3, 4, 6, and 7 by charging both butadiene and styrene monomers. Devolatilized copolymers 1A, 1B, 1C, and 1D were dry blended together to produce invention copolymer 1. Copolymer 1 had a melt flow of 6.1 g/10 min.

TABLE VI

| Components$^a$ | Invention Copolymers | | | |
| --- | --- | --- | --- | --- |
| | Run 1A | Run 1B | Run 1C | Run 1D |
| Step 1 | | | | |
| $NBL_1$, phm | 0.025 | 0.025 | 0.025 | 0.025 |
| $S_1$, phm | 35 | 35 | 35 | 35 |
| Polymerization Time, min | 12 | 12 | 12 | 12 |
| Peak Polymerization Temperature, °C. | 87 | 91 | 91 | 91 |
| Step 2 | | | | |
| $NBL_2$, phm | 0.025 | 0.028 | 0.028 | 0.028 |
| $S_2$, phm | 10 | 10 | 10 | 10 |
| Polymerization Time, min | 9 | 7 | 7 | 7 |
| Peak Polymerization Temperature, °C. | 78 | 80 | 80 | 79 |
| Step 3 | | | | |
| $B_1$, phm | 5 | 5 | 5 | 5 |
| $S_3$, phm | 5 | 5 | 5 | 5 |
| Polymerization Time, min | 10 | 18 | 16 | 18 |
| Peak Polymerization Temperature, °C. | 80 | 83 | 82 | 83 |
| Step 4 | | | | |
| $B_2$, phm | 5 | 5 | 5 | 5 |
| $S_4$, phm | 5 | 5 | 5 | 5 |
| Polymerization Time, min | 20 | 17 | 14 | 12 |
| Peak Polymerization Temperature, °C. | 88 | 88 | 87 | 91 |
| Step 5 | | | | |
| $NBL_3$, phm | 0.075 | 0.070 | 0.070 | 0.070 |
| $S_5$, phm | 10 | 10 | 10 | 10 |
| Polymerization Time, min | 7 | 7 | 7 | 7 |
| Peak Polymerization Temperature, °C. | 90 | 86 | 88 | 90 |
| Step 6 | | | | |
| $B_3$, phm | 5 | 5 | 5 | 5 |
| $S_6$, phm | 5 | 5 | 5 | 5 |
| Polymerization Time, min | 12 | 12 | 11 | 11 |
| Peak Polymerization Temperature, °C. | 91 | 89 | 91 | 91 |
| Step 7 | | | | |
| $B_4$, phm | 5 | 5 | 5 | 5 |
| $S_7$, phm | 5 | 5 | 5 | 5 |
| Polymerization Time, min | 9 | 10 | 10 | 11 |
| Peak Polymerization Temperature °C. | 95 | 92 | 94 | 94 |
| Step 8 | | | | |
| $B_5$, phm | 5 | 5 | 5 | 5 |
| Polymerization Time, min | 10 | 13 | 10 | 10 |
| Peak Polymerization Temperature °C. | 94 | 91 | 90 | 93 |
| Step 9 (Coupling) | | | | |
| Vikoflex 7170, phm | 0.3 | 0.3 | 0.3 | 0.3 |
| Time, min | 16 | 16 | 16 | 16 |
| Temperature, °C. | 95 | 93 | 92 | 93 |
| Step 10 (Terminating) | | | | |
| Water, phm | 0.2 | 0.2 | 0.2 | 0.2 |
| Carbon Dioxide, phm | 0.4 | 0.4 | 0.4 | 0.4 |
| Time, min (Total) | 25 | 25 | 25 | 25 |
| Temperature, °C. | 98 | 94 | 95 | 94 |
| Step 11 (Stabilizing) | | | | |

TABLE VI-continued

| | Invention Copolymers | | | |
|---|---|---|---|---|
| Components[a] | Run 1A | Run 1B | Run 1C | Run 1D |
| Stabilizer Mixture, phm | 1.25 | 1.25 | 1.25 | 1.25 |
| Time, min | 5 | 5 | 5 | 5 |
| Temperature, °C. | 97 | 94 | 95 | 93 |
| Recovered Resin | | | | |
| Melt Flow, g/10 min | 5.9 | 7.2 | 6.0 | 7.3 |

[a]The symbols NBL, S and B, represent, respectively, n-butyllithium initiator, styrene and butadiene. The subscript numbers refer to the numerical order in which that compound was used.

Based on the amounts of monomer additions in Run 1A, assuming substantially complete (co)polymerization of each monomer increment added at each step before proceeding to the next step, and assuming equivalent rates of initiation and propagation, the relative block sizes of each species can be calculated as shown in the following Table VII. The molecular weights ($M_n$) of each species before coupling are estimated by dividing the number of phms of monomers in each chain (species) by the number of moles of alkali metal initiator associated with each chain.

Likewise, the number average molecular weights and the relative amounts of each of the polymer species present after coupling can be calculated. These are shown for the polymer of 1A in Table VII.

TABLE VII

Number Average Molecular Weights of Polymer Species in the Invention Polymer Run 1A[a]

| Polymer Species | Final Fraction | $M_n$ |
|---|---|---|
| $S_1$—$S_2$—$B_1/S_3$—$B_2/S_4$—$S_5$—$B_3/S_6$—$B_4/S_7$—$B_5$-x-$B_5$—$S_7/B_4$—$S_6/B_3$—$S_5$—$S_4/B_2$—$S_3/B_1$—$S_2$—$S_1$ | 0.039 | 271,000 |
| $S_2$—$B_1/S_3$—$B_2/S_4$—$S_5$—$B_3/S_6$—$B_4/S_7$—$B_5$-x-$B_5$—$S_7/B_4$—$S_6/B_3$—$S_5$—$S_4/B_2$—$S_3/B_1$—$S_2$ | 0.039 | 90,000 |
| $S_5$—$B_3/S_6$—$B_4/S_7$—$B_5$-x-$B_5$—$S_7/B_4$—$S_6/B_3$—$S_5$ | 0.350 | 36,000 |
| $S_1$—$S_2$—$B_1/S_3$—$B_2/S_4$—$S_5$—$B_3/S_6$—$B_4/S_7$—$B_5$-x-$B_5$—$S_7/B_4$—$S_6/B_3$—$S_5$—$S_4/B_2$—$S_3/B_1$—$S_2$ | 0.039 | 180,000 |
| $S_1$—$S_2$—$B_1/S_3$—$B_2/S_4$—$S_5$—$B_3/S_6$—$B_4/S_7$—$B_5$-x-$B_5$—$S_7/B_4$—$S_6/B_3$—$S_5$ | 0.117 | 154,000 |
| $S_2$—$B_1/S_3$—$B_2/S_4$—$S_5$—$B_3/S_6$—$B_4/S_7$—$B_5$-x-$B_5$—$S_7/B_4$—$S_6/B_3$—$S_5$ | 0.117 | 63,000 |
| $S_1$—$S_2$—$B_1/S_3$—$B_2/S_4$—$S_6$—$B_3/S_6$—$B_4/S_7$—$B_5$ | 0.060 | 135,000 |
| $S_2$—$B_1/S_3$—$B_2/S_4$—$S_5$—$B_3/S_6$—$B_4/S_7$—$B_5$ | 0.060 | 45,000 |
| $S_5$—$B_3/S_6$—$B_4/S_7$—$B_5$ | 0.180 | 18,000 |

[a]Calculations assume complete initiator efficiency and 70% coupling efficiency.

EXAMPLE II

Four polymerization runs were carried out to prepare a comparative copolymer without tapered blocks. Runs 2A, 2B, 2C, and 2D were done using the same monomer amounts as in Example I, but with the styrene and butadiene charges added in separate steps to form individual blocks instead of together to form tapered blocks. As in Example I, the weight ratio of styrene to butadiene charged was 75 to 75. The charges and results of the runs are shown in Table VIII.

Copolymers 2A, 2B, 2C, and 2D were blended together after devolatilizing to form comparative copolymer 2, which had a melt flow of 5.5 g/10 min.

The monomer charge sequences used in copolymers 1 and 2 are compared here to show the differences. A slash (/) indicates monomers charged together.

| Copolymer 1 | S, S, B/S, B/S, S, B/S, B/S, B |
|---|---|
| Copolymer 2 | S, S, B, S, B, S, S, B, S, B, S, B |

TABLE VIII

| | Comparative Copolymers | | | |
|---|---|---|---|---|
| Components[a] | Run 2A | Run 2B | Run 2C | Run 2D |
| Step 1 | | | | |
| $NBL_1$, phm | 0.025 | 0.0253 | 0.0255 | 0.026 |
| $S_1$, phm | 35 | 35 | 35 | 35 |
| Polymerization Time, min | 12 | 12 | 12 | 12 |
| Peak Polymerization Temperature, °C. | 91 | 89 | 85 | 91 |
| Step 2 | | | | |
| $NBL_2$, phm | 0.028 | 0.028 | 0.028 | 0.028 |
| $S_2$, phm | 10 | 10 | 10 | 10 |
| Polymerization Time, min | 7 | 10 | 4 | 4 |
| Peak Polymerization Temperature, °C. | 80 | 80 | 76 | 79 |
| Step 3 | | | | |
| $B_1$, phm | 5 | 5 | 5 | 5 |
| Polymerization Time, min | 9 | 10 | 12 | 7 |
| Peak Polymerization Temperature, °C. | 78 | 77 | 76 | 82 |
| Step 4 | | | | |
| $S_3$, phm | 5 | 5 | 5 | 5 |
| Polymerization Time, min | 11 | 9 | 7 | 5 |
| Peak Polymerization Temperature, °C. | 82 | 80 | 76 | 84 |
| Step 5 | | | | |
| $B_2$, phm | 5 | 5 | 5 | 5 |
| Polymerization Time, min | 7 | 9 | 10 | 7 |
| Peak Polymerization Temperature, °C. | 85 | 83 | 80 | 88 |
| Step 6 | | | | |
| $S_4$, phm | 5 | 5 | 5 | 5 |
| Polymerization Time, min | 9 | 5 | 8 | 7 |
| Peak Polymerization Temperature, °C. | 86 | 86 | 82 | 89 |
| Step 7 | | | | |
| $NBL_3$, phm | 0.07 | 0.07 | 0.07 | 0.07 |
| $S_5$, phm | 5 | 5 | 5 | 5 |
| Polymerization Time, min | 7 | 9 | 6 | 4 |
| Peak Polymerization Temperature °C. | 88 | 90 | 85 | 91 |
| Step 8 | | | | |
| $B_5$, phm | 5 | 5 | 5 | 5 |
| Polymerization Time, min | 6 | 6 | 8 | 5 |
| Peak Polymerization Temperature °C. | 88 | 86 | 83 | 92 |
| Step 9 | | | | |
| $S_6$, phm | 5 | 5 | 5 | 5 |
| Polymerization Time, min | 6 | 5 | 5 | 5 |
| Peak Polymerization Temperature °C. | 90 | 89 | 86 | 94 |
| Step 10 | | | | |
| $B_4$, phm | 5 | 5 | 5 | 5 |

TABLE VIII-continued

| | Comparative Copolymers | | | |
|---|---|---|---|---|
| Components[a] | Run 2A | Run 2B | Run 2C | Run 2D |
| Polymerization Time, min | 4 | 5 | 6 | 7 |
| Peak Polymerization Temperature °C. | 91 | 91 | 87 | 96 |
| Step 11 | | | | |
| $S_7$, phm | 5 | 5 | 5 | 5 |
| Polymerization Time, min | 5 | 5 | 4 | 4 |
| Peak Polymerization Temperature °C. | 92 | 92 | 89 | 96 |
| Step 12 | | | | |
| $B_5$, phm | 5 | 5 | 5 | 5 |
| Polymerization Time, min | 15 | 11 | 16 | 12 |
| Peak Polymerization Temperature °C. | 94 | 94 | 89 | 97 |
| Step 13 (Coupling) | | | | |
| Vikoflex 7170, phm | 0.3 | 0.3 | 0.3 | 0.3 |
| Time, min | 16 | 16 | 16 | 16 |
| Temperature °C. | 92 | 93 | 92 | 96 |
| Step 14 (Terminating) | | | | |
| Water, phm | 0.2 | 0.2 | 0.2 | 0.2 |
| Carbon Dioxide, phm | 0.4 | 0.4 | 0.4 | 0.4 |
| Time, min (Total) | 25 | 25 | 25 | 25 |
| Temperature °C. | 96 | 96 | 95 | 98 |
| Step 15 (Stabilizing) | | | | |
| Stabilizer Mixture, phm | 1.25 | 1.25 | 1.25 | 1.25 |
| Time, min | 5 | 5 | 5 | 5 |
| Temperature, °C. | 96 | 98 | 97 | 96 |
| Recovered Resin | | | | |
| Melt Flow, g/10 min | 5.9 | 5.4 | 5.3 | 5.4 |

[a]The symbols NBL, S and B, represent, respectively, n-butyllithium initiator, styrene and butadiene. The subscript numbers refer to the numerical order in which that compound was used.

EXAMPLE III

Comparative copolymer 3, a coupled block copolymer of styrene and butadiene without tapered styrene/butadiene blocks, was used for comparison with the invention resins.

Comparative copolymer 3 was prepared from about 75 weight percent styrene and about 25 weight percent butadiene and was polymodal before coupling. The addition sequences were S, S, B, S, B in weight ratios of 40, 20, 8, 15, 17 followed by coupling. Comparative copolymer 3 had a melt flow of 7.0 g/10 min.

EXAMPLE IV

Two comparative copolymers were prepared to demonstrate the importance of the multiple styrene/butadiene tapered blocks and the terminal butadiene segment prior to coupling in the invention copolymer. Both polymerizations were carried out with a total monomer charge of 1500 g. About 79 weight percent of the cyclohexane diluent (3720 g) was charged initially. The rest of the diluent was added during the run as a diluent or flush for the other reactants. Sec-butyl lithium was used as the initiator in these polymerizations and THF was not used.

Copolymers 4A, 4B, 4C, and 4D were prepared with one initial styrene charge, one styrene/butadiene tapered block, and no terminal butadiene segment. Table IX describes the charges and results of these polymerizations. The styrene to butadiene weight ratio of the charged monomers was 75 to 25.

Copolymers 5A, 5B, 5C, and 5D were prepared as described above for copolymers 4A through 4D except that the styrene to butadiene weight ratio was 70 to 30. The charges and results are described in Table X.

Comparative copolymer 4 was prepared by dry blending samples 4A, 4B, 4C, and 4D. Copolymer 4 had a melt flow of 7.5 g/10 min. Comparative copolymer 5 was prepared by dry blending samples 5A, 5B, 5C, and 5D. Copolymer 5 had a melt flow of 6.6 g/10 min.

TABLE IX

| | Comparative Copolymer 4 | | | |
|---|---|---|---|---|
| Component[a] | Run 4A | Run 4B | Run 4C | Run 4D |
| Step 1 | | | | |
| $SBL_1$, phm | 0.06 | 0.06 | 0.06 | 0.06 |
| $S_1$, phm | 50 | 50 | 50 | 50 |
| Polymerization Time, min | 10 | 10 | 10 | 10 |
| Peak Polymerization Temperature, °C. | 68 | 69 | 68 | 69 |
| Step 2 | | | | |
| $SBL_2$, phm | 0.078 | 0.078 | 0.078 | 0.078 |
| $S_2$, phm | 25 | 25 | 25 | 25 |
| $B_1$, phm | 25 | 25 | 25 | 25 |
| Polymerization Time, min | 10 | 10 | 10 | 10 |
| Peak Polymerization Temperature, °C. | 92 | 91 | 88 | 82 |
| Step 3 (Coupling) | | | | |
| Vikoflex 7170, phm | 0.4 | 0.4 | 0.4 | 0.4 |
| Time, min | 16 | 16 | 16 | 16 |
| Temperature, °C. | 89 | 95 | 92 | 92 |
| Step 4 (Terminating) | | | | |
| Water, phm | 0.2 | 0.2 | 0.2 | 0.2 |
| Carbon Dioxide, phm | 0.4 | 0.4 | 0.4 | 0.4 |
| Time, min (Total) | 25 | 25 | 25 | 25 |
| Temperature, °C. | 91 | 93 | 89 | 87 |
| Step 5 (Stabilizing) | | | | |
| Stabilizer Mixture, phm | 1.25 | 1.25 | 1.25 | 1.25 |
| Time, min | 5 | 5 | 5 | 5 |
| Temperature, °C. | 95 | 94 | 89 | 89 |
| Recovered Resin | | | | |
| Melt Flow, g/10 min | 7.4 | 7.1 | 6.7 | 6.95 |

[a]The symbols SBL, S and B, represent, respectively, sec-butyllithium initiator, styrene and butadiene. The subscript numbers refer to the numerical order in which that compound was used.

TABLE X

| | Comparative Copolymer 5 | | | |
|---|---|---|---|---|
| Component[a] | Run 5A | Run 5B | Run 5C | Run 5D |
| Step 1 | | | | |
| $SBL_1$, phm | 0.062 | 0.065 | 0.065 | 0.065 |
| $S_1$, phm | 40 | 40 | 40 | 40 |
| Polymerization Time, min | 12 | 12 | 12 | 12 |
| Peak Polymerization Temperature, °C. | 56 | 60 | 63 | 58 |
| Step 2 | | | | |
| $SBL_2$, phm | 0.081 | 0.084 | 0.084 | 0.084 |
| $S_2$, phm | 30 | 30 | 30 | 30 |
| $B_1$, phm | 30 | 30 | 30 | 30 |
| Polymerization Time, min | 40 | 40 | 40 | 40 |
| Peak Polymerization Temperature, °C. | 78 | 88 | 92 | 86 |
| Step 3 (Coupling) | | | | |
| Vikoflex 7170, phm | 0.40 | 0.40 | 0.40 | 0.40 |
| Time, min | 16 | 16 | 16 | 16 |
| Temperature, °C. | 93 | 88 | 88 | 86 |
| Step 4 (Terminating) | | | | |
| Water, phm | 0.2 | 0.2 | 0.2 | 0.2 |
| Carbon Dioxide, phm | 0.4 | 0.4 | 0.4 | 0.4 |
| Time, min (Total) | 25 | 25 | 25 | 25 |
| Temperature, °C. | 87 | 87 | 92 | 89 |
| Step 5 (Stabilizing) | | | | |
| Stabilizer Mixture, phm | 1.25 | 1.25 | 1.25 | 1.25 |
| Time, min | 5 | 5 | 5 | 5 |
| Temperature, °C. | 85 | 87 | 85 | 85 |
| Recovered Resin | | | | |

TABLE X-continued

| | Comparative Copolymer 5 | | | |
|---|---|---|---|---|
| Component[a] | Run 5A | Run 5B | Run 5C | Run 5D |
| Melt Flow, g/10 min | 4.9 | 6.9 | 7.2 | 5.9 |

[a] The symbols SBL, S and B, represent, respectively, sec-butyllithium initiator, styrene and butadiene. The subscript numbers refer to the numerical order in which that compound was used.

EXAMPLE V

Two more comparison copolymers were prepared to demonstrate the importance of the structural features of the invention copolymers for environmental stress crack resistance. The styrene to butadiene weight ratios of the charged monomers were 75 to 25.

Copolymers 6A, 6B, 6C, and 6D were made with one initial styrene charge, two tapered butadiene/styrene blocks, and no terminal butadiene segment prior to coupling. The polymerization charges and results are summarized in Table XI. These four copolymers were dry blended to form comparison copolymer 6, which had a melt flow of 7.2 g/10 min.

Copolymers 7A, 7B, 7C, and 7D were prepared by sequentially forming styrene, styrene, butadiene, styrene, and butadiene segments and then coupling. These copolymers contain no tapered blocks. The polymerization charges and results are shown in Table XII. These four copolymers were dry blended to yield comparison copolymer 7, which had a melt flow of 7.7 g/10 min.

TABLE XI

| | Comparative Copolymer 6 | | | |
|---|---|---|---|---|
| Component[a] | Run 6A | Run 6B | Run 6C | Run 6D |
| Step 1 | | | | |
| NBL$_1$, phm | 0.030 | 0.030 | 0.030 | 0.030 |
| S$_1$, phm | 40.1 | 40.1 | 40.1 | 40.1 |
| Polymerization Time, min | 12 | 12 | 12 | 12 |
| Peak Polymerization Temperature, °C. | 83 | 85 | 82 | 76 |
| Step 2 | | | | |
| NBL$_2$, phm | 0.030 | 0.030 | 0.030 | 0.030 |
| B$_1$, phm | 8 | 8 | 8 | 8 |
| S$_2$, phm | 19.7 | 19.7 | 19.7 | 19.7 |
| Polymerization Time, min | 40 | 40 | 40 | 40 |
| Peak Polymerization Temperature, °C. | 86 | 86 | 87 | 79 |
| Step 3 | | | | |
| NBL$_3$, phm | 0.050 | 0.050 | 0.050 | 0.050 |
| B$_2$, phm | 17.5 | 17.5 | 17.5 | 17.5 |
| S$_3$, phm | 14.6 | 14.6 | 14.6 | 14.6 |
| Polymerization Time, min | 40 | 40 | 40 | 40 |
| Peak Polymerization Temperature, °C. | 106 | 106 | 109 | 100 |
| Step 4 (Coupling) | | | | |
| Vikoflex 7170, phm | 0.40 | 0.40 | 0.40 | 0.40 |
| Time, min | 16 | 16 | 16 | 16 |
| Temperature, °C. | 90 | 88 | 90 | 95 |
| Step 5 (Terminating) | | | | |
| Water, phm | 0.2 | 0.2 | 0.2 | 0.2 |
| Carbon Dioxide, phm | 0.4 | 0.4 | 0.4 | 0.4 |
| Time, min (Total) | 25 | 25 | 25 | 25 |
| Temperature, °C. | 88 | 82 | 85 | 85 |
| Step 6 (Stabilizing) | | | | |
| Stabilizer Mixture, phm | 1.25 | 1.25 | 1.25 | 1.25 |
| Time, min | 5 | 5 | 5 | 5 |
| Temperature, °C. | 87 | 83 | 85 | 88 |
| Recovered Resin | | | | |
| Melt Flow, g/10 min | 7.3 | 6.8 | 7.1 | 7.5 |

[a] The symbols NBL, S and B, represent, respectively, n-butyllithium initiator, styrene and butadiene. The subscript numbers refer to the numberical order in which that compound was used.

TABLE XII

| | Comparative Copolymer 7 | | | |
|---|---|---|---|---|
| Component[a] | Run 7A | Run 7B | Run 7C | Run 7D |
| Step 1 | | | | |
| NBL$_1$, phm | 0.030 | 0.030 | 0.030 | 0.030 |
| S$_1$, phm | 40.1 | 40.1 | 40.1 | 40.1 |
| Polymerization Time, min | 12 | 12 | 12 | 12 |
| Peak Polymerization Temperature, °C. | 79 | 80 | 81 | 85 |
| Step 2 | | | | |
| NBL$_2$, phm | 0.030 | 0.030 | 0.030 | 0.030 |
| S$_2$, phm | 19.7 | 19.7 | 19.7 | 19.7 |
| Polymerization Time, min | 12 | 12 | 12 | 12 |
| Peak Polymerization Temperature, °C. | 77 | 76 | 76 | 76 |
| Step 3 | | | | |
| B$_1$, phm | 8 | 8 | 8 | 8 |
| Polymerization Time, min | 16 | 16 | 16 | 16 |
| Peak Polymerization Temperature, °C. | 79 | 72 | 72 | 72 |
| Step 4 | | | | |
| NBL$_3$, phm | 0.105 | 0.105 | 0.105 | 0.105 |
| S$_3$, phm | 14.6 | 14.6 | 14.6 | 14.6 |
| Polymerization Time, min | 12 | 12 | 12 | 12 |
| Peak Polymerization Temperature, °C. | 79 | 94 | 92 | 81 |
| Step 5 | | | | |
| B$_2$, phm | 17.5 | 17.5 | 17.5 | 17.5 |
| Polymerization Time, | 16 | 16 | 16 | 16 |
| Peak Polymerization Temperature, °C. | 94 | 95 | 95 | 94 |
| Step 6 (Coupling) | | | | |
| Vikoflex 7170, phm | 0.39 | 0.39 | 0.39 | 0.39 |
| Time, min | 16 | 16 | 16 | 16 |
| Temperature, °C. | 84 | 81 | 80 | 86 |
| Step 7 (Terminating) | | | | |
| Water, phm | 0.2 | 0.22 | 0.22 | 0.22 |
| Carbon Dioxide, phm | 0.4 | 0.4 | 0.4 | 0.4 |
| Time, min (Total) | 25 | 25 | 25 | 25 |
| Temperature, °C. | 81 | 81 | 85 | 86 |
| Step 8 (Stabilizing) | | | | |
| Stabilizer Mixture, phm | 1.25 | 1.25 | 1.25 | 1.25 |
| Time, min | 5 | 5 | 5 | 5 |
| Temperature, °C. | 88 | 82 | 83 | 82 |
| Recovered Resin | | | | |
| Melt Flow, g/10 min | 6.4 | 7.2 | 7.7 | 6.7 |

[a] The symbols NBL, S and B, represent, respectively, n-butyllithium initiator, styrene and butadiene. The subscript numbers refer to the numerical order in which that compound was used.

EXAMPLE VI

This example compares the puncture test results of invention copolymer 1 from Example I with comparative copolymers 2, 3, 4, 5, 6, and 7 from Examples II, III, IV, and V. Each sample was converted into sheet form by melt extrusion at a temperature of about 175°–185° C. using a sheet die and a cooled polishing roll. Puncture testing was done as described above. Longer test times indicate that the sample had more environmental stress crack resistance than samples with shorter test times.

The comparative test results are presented in Table XIII. These results show that invention copolymer 1 had an enhanced resistance (31 min in curl up and 121 min in curl down orientation) to environmental stress cracking relative to comparative copolymers without tapered styrene/butadiene segments (copolymers 2, 3, and 7) or with only one or two tapered butadiene/styrene blocks and without terminal butadiene segments prior to coupling (copolymers 4, 5, and 6).

TABLE XIII

Puncture Test Results

| Copolymer | Type | Melt Flow, g/10 min | Puncture Test, min[a] CU | Puncture Test, min[a] CD |
|---|---|---|---|---|
| 1 | Invention | 6.1 | 31 | 121 |
| 2 | Comparative | 5.5 | 11 | 16.2 |
| 3 | Comparative | 7.0 | 4.4 | 4.6 |
| 4 | Comparative | 7.5 | 0.31 | 0.34 |
| 5 | Comparative | 6.6 | 0.23 | 0.26 |
| 6 | Comparative | 7.2 | 3.05 | 4.96 |
| 7 | Comparative | 7.7 | 6.04 | 8.20 |

[a]As described in the specifications. Higher numbers indicate more environmental stress crack resistance.

EXAMPLE VII

The physical properties of invention copolymer 1 were determined and compared with the properties of a commercial KR03 styrene-butadiene block copolymer 8 (KR03 grade K-Resin ® polymer available from Phillips Petroleum Company). Sample 8 is essentially the same as previous sample 3, but from a different lot. Test specimens were prepared on an Arburg injection molding machine with a barrel temperature of about 210° C., a mold temperature of about 25° C., a screw speed setting of about 360 rpm, and injection pressure adjusted to fill the mold (generally about 60 to about 70 KP/cm$^2$), and a total cycle time of 45 seconds.

The test results, shown in Table XIV, indicate that the invention copolymer 1 has an increased Izod impact and elongation at break and a decreased flexural modulus compared with sample 8.

TABLE XIV

Physical Properties

| Property | Copolymer 1 | Copolymer 8 |
|---|---|---|
| Hardness, Shore D | 64 | 66 |
| Flexural Modulus, MPa | 853 | 1418 |
| Tensile Break, MPa | 25 | 29 |
| Elongation at Break, % | 367 | 275 |
| Izod Impact Notched, J/m | 788[a] | 25 |

[a]One specimen did not break.

While the polymers and methods of this invention have been described in detail for the purpose of illustration, the inventive polymers and methods are not to be construed as limited thereby. This patent is intended to cover all changes and modifications within the spirit and scope thereof.

That which is claimed is:

1. A method of preparing a polymer comprising:
(a) charging into a polymerization zone an initiator and a monovinylaromatic monomer in the presence of a randomizer and allowing polymerization to occur until essentially no free monomer is present; thereafter
(b) charging into said polymerization zone a monovinylaromatic monomer and an initiator and allowing polymerization to occur until essentially no free monomer is present; thereafter
(c) charging into said polymerization zone a mixture of monovinylaromatic monomer and conjugated diene monomer and allowing polymerization to occur until essentially no free monomer is present; thereafter
(d) charging into said polymerization zone a mixture of monovinylaromatic monomer and conjugated diene monomer and allowing polymerization to occur until essentially no free monomer is present; thereafter
(e) charging into said polymerization zone a monovinylaromatic monomer and an initiator and allowing polymerization to occur until essentially no free monomer is present; thereafter
(f) charging into said polymerization zone a mixture of monovinylaromatic monomer and conjugated diene monomer and allowing polymerization to occur until essentially no free monomer is present; thereafter
(g) charging into said polymerization zone a mixture of monovinylaromatic monomer and conjugated diene monomer and allowing polymerization to occur until essentially no free monomer is present; thereafter
(h) charging into said polymerization zone a conjugated diene monomer and allowing polymerization to occur until essentially no free monomer is present; and thereafter
(i) charging the reaction mixture with a coupling agent.

2. A method according to claim 1 wherein said monovinylaromatic monomer contains 8 to 12 carbon atoms and said conjugated diene contains 4 to 6 carbon atoms, said monomers being added in a ratio of about 55 to 95 weight percent monovinylaromatic monomer and about 5 to about 45 weight percent conjugated diene monomer, thus giving a resinous tapered block copolymer.

3. A method according to claim 1 wherein said monovinylaromatic monomer contains 8 to 12 carbon atoms and said conjugated diene contains 4 to 6 carbon atoms, said monomers being added in a ratio of about 60 to 90 weight percent monovinylaromatic monomer and 10 to 40 weight percent conjugated diene monomer, thus giving a resinous tapered block copolymer.

4. A method according to claim 1 wherein said monovinylaromatic monomer contains 8 to 12 carbon atoms and said conjugated diene contains 4 to 6 carbon atoms, said monomers being added in a ratio of about 65 to 85 weight percent monovinylaromatic monomer and 15 to 35 weight percent conjugated diene monomer, thus giving a resinous tapered block copolymer.

5. A method according to claim 1 wherein the weight ratio of the amounts of said monovinylaromatic monomer and said conjugated diene monomer in steps (c), (d), (f) and (g) is within the range of about 1 to 0.63 to about 1 to 2.

6. A method according to claim 1 wherein the weight ratio of said monovinylaromatic monomer and said conjugated diene monomer in steps (c), (d), (f) and (g) is within the range of about 1:0.67 to about 1:1.8.

7. A method according to claim 1 wherein the weight ratio of said monovinylaromatic monomer and said conjugated diene monomer in steps (c), (d), (f) and (g) is within the range of about 1:0.8 to about 1:1.5.

8. A method according to claim 1 wherein the weight ratio of said monovinylaromatic monomer and said conjugated diene monomer in steps (c), (d), (f), and (g) is about 1:1.

9. A method according to claim 1 wherein said monovinylaromatic monomer charged in Step (a) is from about 20 to about 50 parts per hundred parts total monomer charged in said method; and wherein said monovinylaromatic monomer charged in Step (b) is from about 5 to about 20 parts per hundred parts total monomer charged in said method;

wherein said monovinylaromatic monomer charged in Step (c) is from about 2 to about 7 parts per hundred parts total monomer charged in said method;

wherein said monovinylaromatic monomer charged in Step (d) is from about 2 to about 7 weight percent of the total weight percent of monovinylaromatic monomer charged in said method;

wherein said monovinylaromatic monomer charged in Step (e) is from about 2 to about 20 weight percent of the total weight percent of monvinylaromatic monomer charged in said method;

wherein said monovinylaromatic monomer charged in Step (f) is from about 2 to about 7 parts per hundred parts total monomer charged in said method;

wherein said monovinylaromatic monomer charged in Step (g) is from about 2 to about 7 parts per hundred parts total monomer charged in said method.

10. A method according to claim 1 wherein said monovinylaromatic monomer charged in Step (a) is from about 25 to about 45 parts per hundred parts total monomer charged in said method; and wherein said monovinylaromatic monomer charged in Step (b) is from about 7 to about 15 parts per hundred parts total monomer charged in said method;

wherein said monovinylaromatic monomer charged in Step (c) is from about 3 to about 6 parts per hundred parts total monomer charged in said method;

wherein said monovinylaromatic monomer charged in Step (d) is from about 3 to about 6 parts per hundred parts total monomer charged in said method;

wherein said monovinylaromatic monomer charged in Step (e) is from about 7 to about 15 parts per hundred parts total monomer charged in said method;

wherein said monovinylaromatic monomer charged in Step (f) is from about 3 to about 6 parts per hundred parts total monomer charged in said method; and wherein said monovinylaromatic monomer charged in Step (g) is from about 3 to about 6 parts per hundred parts total monomer charged in said method.

11. A method according to claim 1 wherein said monovinylaromatic monomer charged in Step (a) is from about 32 to about 38 parts per hundred parts total monomer charged in said method; and wherein said monovinylaromatic monomer charged in Step (b) is from about 9 to about 13 parts per hundred parts total monomer charged in said method;

wherein said monovinylaromatic monomer charged in Step (c) is from about 4 to about 5 parts per hundred parts total monomer charged in said method;

wherein said monovinylaromatic monomer charged in Step (d) is from about 4 to about 5 parts per hundred parts total monomer charged in said method;

wherein said monovinylaromatic monomer charged in Step (e) is from about 9 to about 13 parts per hundred parts total monomer charged in said method;

wherein said monovinylaromatic monomer charged in Step (f) is from about 4 to about 5 parts per hundred parts total monomer charged in said method; and wherein said monovinylaromatic monomer charged in Step (g) is from about 4 to about 5 parts per hundred parts total monomer charged in said method.

12. A method according to claim 1 wherein said initiator in Step (b) is present in an amount at least equal to the amount of said initiator in Step (a); and wherein said initiator in Step (e) is present in an amount from about 1.5 to about 5 times greater than said amount of said initiator in Step (b).

13. A method according to claim 12 wherein said initiator in Step (b) is present in an amount from about 1 to about 1.2 times greater than the amount of said initiator in Step (a); and wherein said initiator in Step (c) is present in an amount from about 2 to about 5 times greater than the amount of said initiator in Step (a).

14. A method according to claim 1 wherein said conjugated diene monomer is 1,3-butadiene, said monovinylaromatic monomer is styrene, said organomonoalkali metal initiator is one chosen from the group of n-butyllithium and sec-butyllithium, and said randomizer is tetrahydrofuran, and said coupling agent is epoxidized vegatable oil.

15. A method according to claim 14;

wherein the polymerization is carried out in a hydrocarbon diluent;

wherein the polymerization is carried out in a substantial absence of oxygen and water at temperatures ranging from $-10°$ C. to $150°$ C.;

wherein, after said coupling agent reacts with products of said polymerization, the system is treated with a terminating agent and then a stabilizer; and wherein, after termination with said terminating agents, any remaining hydrocarbon diluent is flashed off.

16. A method according to claim 15;

wherein said terminating agent comprises water and carbon dioxide; and wherein said stabilizer is chosen from the group of hindered phenols and organophosphites.

17. Polymodal copolymers produced in accordance with the method of claim 1.

18. An article made from the polymer of claim 17.

* * * * *